United States Patent [19]
Westra

[11] 3,811,142
[45] May 21, 1974

[54] UNIVERSAL SPACER CONNECTOR FOR VERTICAL MOORING BUOY HOSES

[75] Inventor: Simon Westra, The Hague, Netherlands

[73] Assignee: Shell Oil Company, New York, N.Y.

[22] Filed: Mar. 20, 1972

[21] Appl. No.: 235,977

[30] Foreign Application Priority Data
Feb. 23, 1971 Netherlands.................... 7102363

[52] U.S. Cl................................................. 9/8 P
[51] Int. Cl........................................... B63b 35/00
[58] Field of Search .............. 9/8 P, 8 R; 248/68 R; 61/46, 48

[56] References Cited
UNITED STATES PATENTS

| | | | |
|---|---|---|---|
| 3,366,088 | 6/1968 | Gibson | 9/8 P |
| 3,383,870 | 5/1968 | Costello | 61/48 |
| 3,385,545 | 5/1968 | Patton | 248/68 R |
| 3,465,374 | 9/1969 | Johnson et al. | 9/8 P |
| 3,708,811 | 1/1973 | Flory | 9/8 P |

FOREIGN PATENTS OR APPLICATIONS

| | | | |
|---|---|---|---|
| 970,100 | 8/1950 | Germany | 61/46 |
| 912,917 | 11/1951 | Germany | 61/46 |

Primary Examiner—George E. A. Halvosa
Assistant Examiner—Gregory W. O'Connor

[57] ABSTRACT

A universal spacer connector for interconnecting the vertical parts of a pair of hoses interconnecting a submarine pipeline with a single buoy mooring comprising two universal joints each allowing rotation around vertical and horizontal axes and including a coupling allowing relative rotation of the two halves of the connector around the longitudinal axis of the connector.

1 Claim, 3 Drawing Figures

PATENTED MAY 21 1974 3,811,142
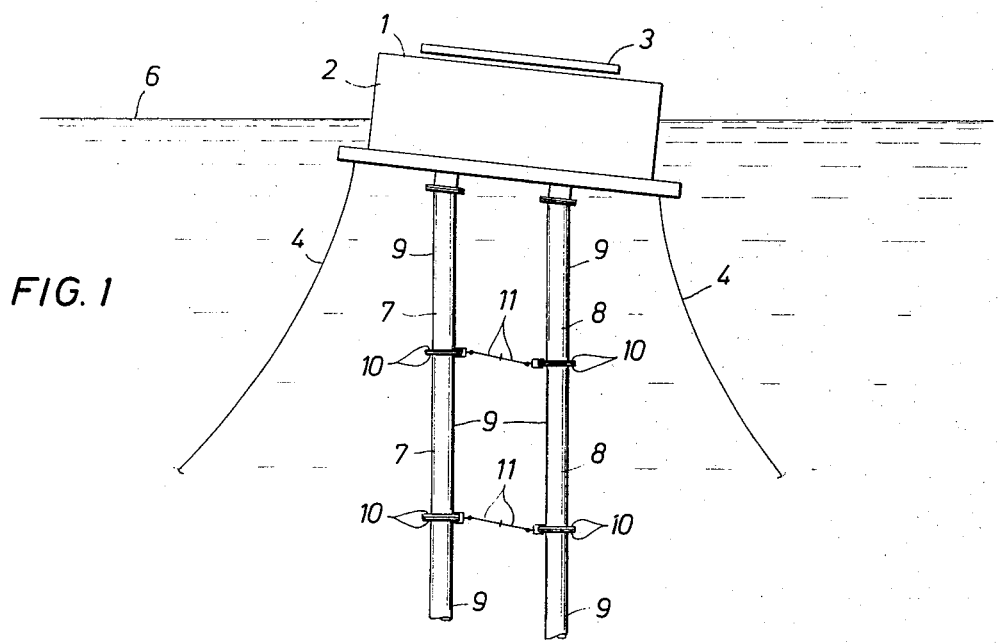
FIG. 1
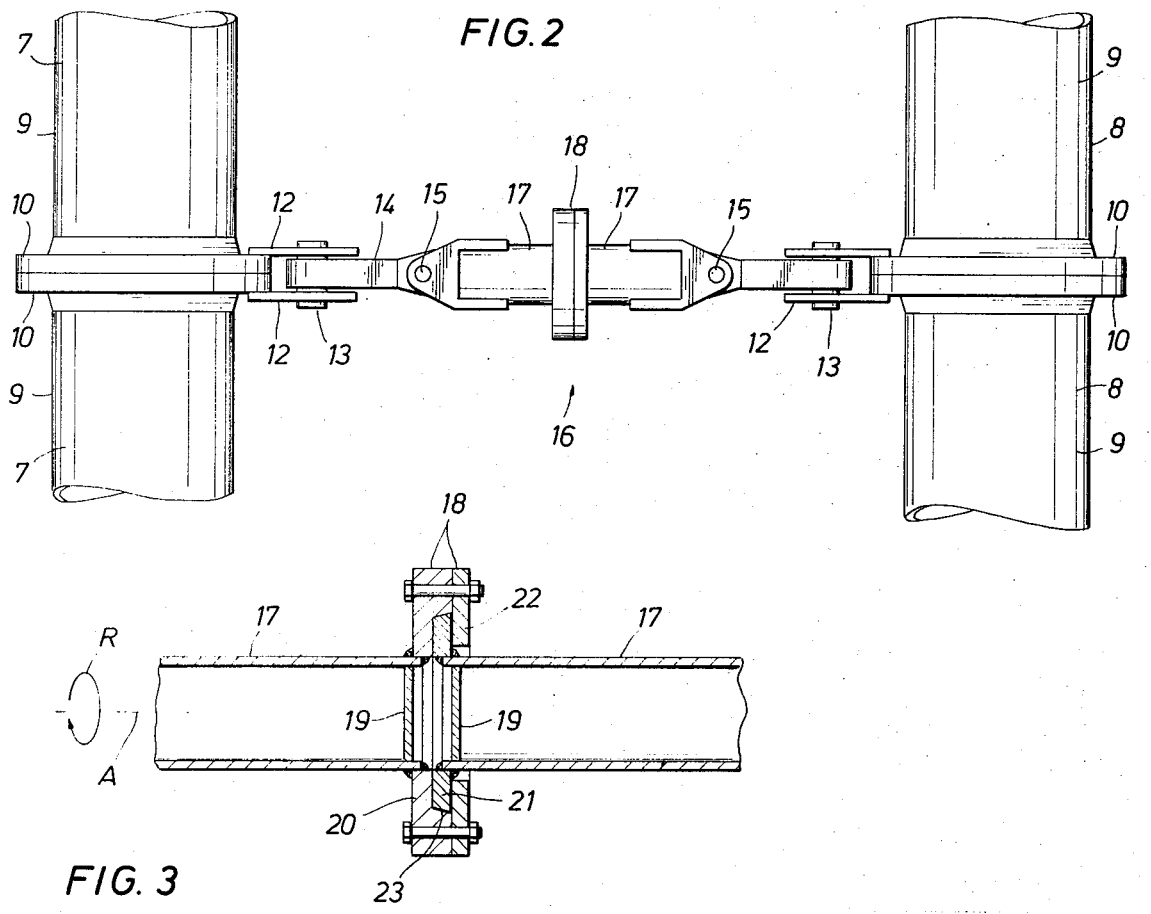
FIG. 2
FIG. 3

UNIVERSAL SPACER CONNECTOR FOR VERTICAL MOORING BUOY HOSES

BACKGROUND OF THE INVENTION

The invention relates to a system for mooring, loading and unloading ships, in particular tankers, comprising a buoy anchored to the bottom of the water, in which one or more pipelines on the floor of the body of water are connected with the buoy by at least two hoses.

In such a system, which is known, for example, from applicant's Patent Application Ser. No. 882,800 (filed on Dec. 5, 1969), now U.S. Pat. No. 3,651,525, the problem arises that the vertical parts of the hoses tend to fan out because of wave movement and water current causing risk of rapid wear or damage to the hoses.

One approach to this problem has been to interconnect the vertical parts of the hoses by means of rigid plates or canvas straps, but in practice such approaches are not satisfactory and breakage of the rigid plates or the canvas straps occur.

SUMMARY OF THE INVENTION

Applicant has now found a solution to this problem that is satisfactory in practice.

Accordingly, the invention is directed to a system for mooring, loading and unloading ships of the above-mentioned type and is characterized in that the vertical parts of the hoses are interconnected by at least one spacer comprising at least two universal joints maintaining the vertical parts of the hoses in a substantially parallel relationship.

In a preferred embodiment of the invention the spacer consists of at least two parts, between which a further connection is provided such that these parts are rotatable with respect to each other around the longitudinal axis of the spacer.

BRIEF DESCRIPTION OF THE DRAWING

The invention will now be described with reference to the Figures, which show an embodiment of the invention in which:

FIG. 1 is a side view of the buoy with the vertical parts of the hoses and the spacer with the buoy listing slightly;

FIG. 2 is a side view of the spacer; and

FIG. 3 is a longitudinal cross-section of the rotatable connection between the two parts of the spacer.

DESCRIPTION OF A PREFERRED EMBODIMENT

In FIG. 1 the buoy for mooring, loading and unloading a ship is designated by reference numeral 1. The buoy 1 is a single-point mooring buoy of the customary type substantially comprising a buoy body 2 and a rotatable part 3. The ship is normally attached by a mooring cable to the rotatable part 3. The buoy 1 is anchored in the customary manner to the bottom (not shown) of the water 5 by means of a number of anchor cables 4. The water surface is designated by the reference numeral 6. Further details of the single-point mooring buoy 1 as such will not be discussed here, since they are generally known. Reference may be made to, for example, Patent Application Ser. No. 882,800.

On the bottom of the water 5 one or more pipelines (not shown) are present for the supply or discharge of a fluid such as crude oil or natural gas to or from the buoy 1. This pipeline is or these pipelines are connected to the buoy 1 by means of two hoses 7 and 8. In FIG. 1 only the vertical parts of the hoses 7 and 8 are shown because only these are of importance to the invention. The hoses 7 and 8 are made up in the customary manner of sections 9 which are interconnected by means of flanges 10. The hoses 7 and 8 are interconnected at the flanges 10 by spacers according to the invention, which are shown diagrammatically in FIG. 1 and are designated by reference numeral 11.

The principle of the spacer 11 will be more fully understood with reference to FIGS. 2 and 3, which show in more detail one embodiment of the spacer 11.

A pair of parallel plates 12 are immovably attached to each pair of flanges 10, for example by means of bolts (not shown). Each pair of plates 12 is perforated and a vertical pin 13 is present in the perforation. The pin 13 also extends through a perforation in an element 14. Each element 14 is connected with a center piece 16 by means of a horizontal pin 15. The center piece 16 comprises two parts 17 between which there is a connection 18, which is so designed that parts 17 are rotatable with respect to each other around the longitudinal axis of the spacer.

The connection 18 is a friction coupling and is shown in more detail in FIG. 3. The parts 17 are made of, for example, pipe. Near the free end of each pipe 17 a plate 19 is welded on the pipe 17 for reinforcement. A flange 20 is welded onto the left-hand pipe 17 and a flange 21 is welded onto the right-hand pipe 17. The flange 21 fits into a bowl-shaped recess 23 in the flange 20. The flange 21 is retained in the bowl-shaped recess 23 in the flange 20 by a flange 22 which is attached to the flange 20 with bolts. In this way the flange 21 can rotate around the axis A with some friction in the bowl-shaped recess 23 of the flange 20. The connection therefore allows the right-hand part 17 to rotate (see arrows R) around the axis A with respect to the left-hand part 17.

The vertical pin 13 allows the element 14 to swivel in a horizontal plane with respect to the parallel plates 12 immovably attached to the flanges 10. The horizontal pin 15, in its turn, allows the part 14 to swivel in a vertical plane with respect to the center piece 16.

It follows from this that the ends of center piece 16 are attached to the flanges 10 by means of universal joints.

If the buoy 1 lists slightly owing to the mooring force of the ship, as shown in FIG. 1, the flanges 10 of the hoses 7 and 8 will no longer remain in the same horizontal plane. This is taken up by those pivots of the spacer 11 which allow a swivelling motion in the vertical plane around pin 15.

The hoses 7 and 8 must also be capable of moving slightly with respect to each other in a horizontal plane. This is taken up by the pivots of the spacer 11, which allow a swivelling motion in the horizontal plane around pin 13.

Since the hoses 7 and 8 are flexible, the displacement of the hoses 7 and 8 will at times cause the flanges 10 to be at a certain angle with respect to each other. To prevent torsion in the spacer 11 the connection 18 is provided, allowing relative rotation of the parts of the spacer 11.

The advantage of connecting the hoses 7 and 8 together by means of the spacer 11 as described is that the displacement of the hoses 7 and 8 as a result of bad weather conditions remains restricted. Notwithstanding, the hoses 7 and 8 are allowed sufficient freedom of movement during movement of the buoy 1 as a result of forces exerted on the buoy 1 by ships which are moored to the buoy 1. The special construction of the spacer 11 prevents bending and/or torsional moments occurring in the hoses substantially reducing the risk of their breaking.

I claim as my invention:

1. A system for loading and unloading ships comprising:

a buoy floating in a body of water and anchored to the floor of said body of water;

at least two vertical hoses operatively connected to said buoy and a submarine pipeline for transfer of fluid therebetween; and at least one spacer interconnecting said vertical hoses so as to maintain them in a substantially parallel fixed-spaced relationship, said spacer being connected to each vertical hose by a pair of parallel plates having a perforation therethrough for pinably connecting one end of said spacer between said parallel plates, said parallel plates being immovably attached to said vertical hose.

* * * * *